United States Patent
Hanna

[11] Patent Number: 5,855,335
[45] Date of Patent: *Jan. 5, 1999

[54] SEAT BELT RETRACTOR SPRING CASSETTE

[75] Inventor: Harry Hanna, Gaigavon, United Kingdom

[73] Assignee: European Components Co. Limited, Belfast, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 671,764

[22] Filed: Jun. 28, 1996

[30] Foreign Application Priority Data

Jun. 28, 1995 [GB] United Kingdom ............... 9513159

[51] Int. Cl.[6] ............... B65H 75/48; B60R 22/34
[52] U.S. Cl. ............... 242/375.2; 280/807
[58] Field of Search ............... 242/375.2; 184/45, 184/37; 29/418, 446; 280/807

[56] References Cited

U.S. PATENT DOCUMENTS

| | | | |
|---|---|---|---|
| 4,159,809 | 7/1979 | Rawson | 242/375.2 |
| 4,995,567 | 2/1991 | Ballet | 242/375.2 |
| 5,314,137 | 5/1994 | Fujimura et al. | 242/375.2 |

FOREIGN PATENT DOCUMENTS 2 076 635  12/1981  United Kingdom.

*Primary Examiner*—John Nguyen
*Attorney, Agent, or Firm*—Foley & Lardner

[57] ABSTRACT

In the manufacture of a seat belt retractor, it is usual to join together a pre-stressed spring cassette with a part which includes the seat belt reel. A spring cassette is provided which includes a pin (20) for locking the spring core (16) and spring cover (10) to prevent them from rotating once the spring (14) has been pre-stressed to exert a desired torque. The spring cassette can then be conveniently handled when assembling the seat belt retractor, and then the pin (20) can be slid within the spring cassette to unlock the spring core (16) and spring cover (10) to allow the seat belt retractor to function as usual.

8 Claims, 3 Drawing Sheets

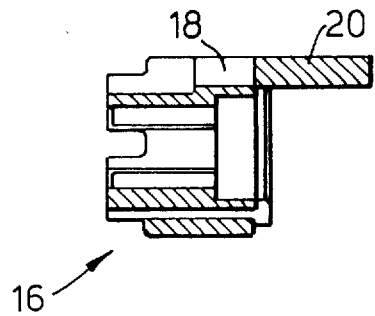
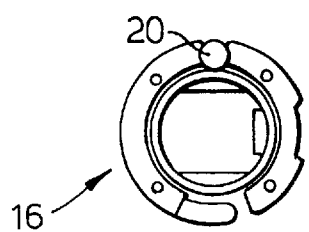
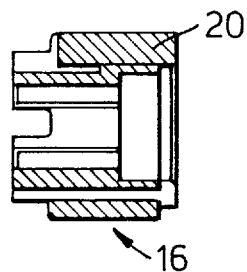
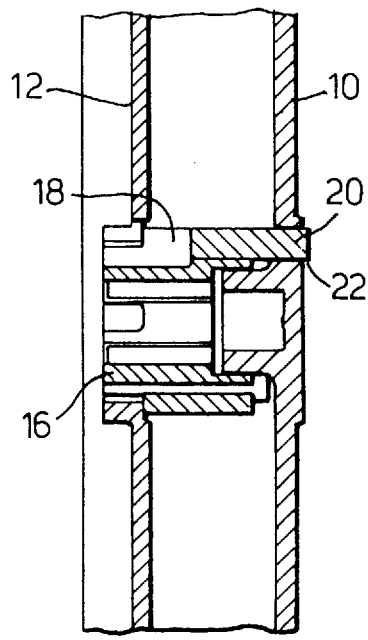
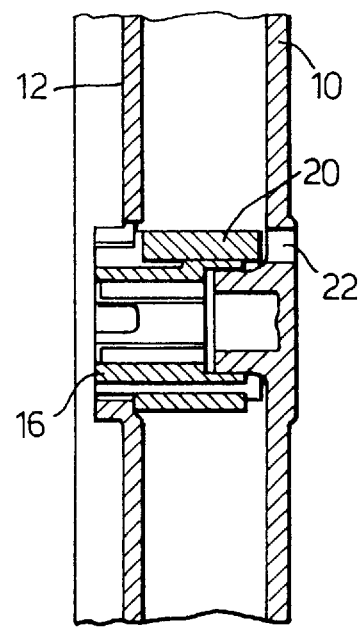

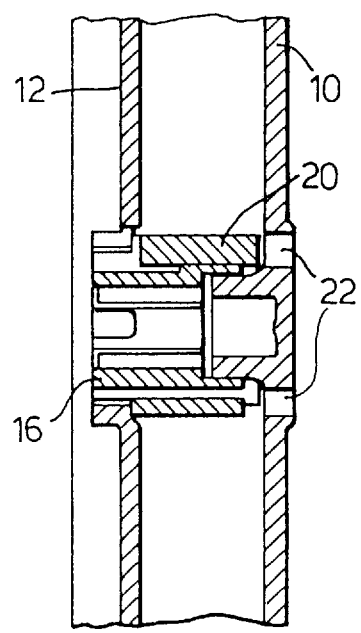

SEAT BELT RETRACTOR SPRING CASSETTE

The present invention relates to a spring cassette for a seat belt retractor in a motor vehicle.

BACKGROUND OF THE INVENTION

It is well known to provide seat belts in motor vehicles for the safety of the occupants. When worn, a seat belt restrains an occupant of a seat, in particular in a motor accident. A seat belt is typically provided with a retractor which serves two purposes; when the belt is not in use it is wound onto a reel which keeps the belt out of the way and secondly the retractor maintains the belt in tension across the body of an occupant of the seat when in use. Thus there is no slack in the belt and the occupant is effectively restrained by an inertia locking mechanism on the belt reel when the vehicle is subject to a sudden change in speed such as in an accident. However the retractor does still allow gradual movement for the comfort of the occupant when in normal use.

A conventional seat belt retractor has a reel around which the belt is wound inside a casing and has a spring cassette. The spring cassette includes a spring cover, a spring core and a spring. When assembled the spring cover is fixed to the retractor case and the spring core is connected to the reel on which the belt is wound. The spring provides a torque which tends to rotate the spring core and belt reel with respect to the case. This torque keeps the belt taut and also rotates the reel to wind in the belt when not in use. When assembling the seat belt retractor it is necessary that the spring is pre-stressed so that it provides a predetermined tension in the belt even when fully retracted. This is achieved by assembling the components of the spring cassette and then rotating the spring core relative to the spring cover until the spring is exerting the required torque. However, it is difficult to maintain this torque while the spring cassette and belt reel are being coupled together.

BRIEF SUMMARY OF THE INVENTION

Accordingly, the present invention provides a seat belt retractor spring cassette comprising:

a spring cover;

a spring core rotatably mounted on the spring cover;

a spring for providing a torque to tend to rotate the spring core with respect to the spring cover; and locking means contained within the spring cassette slidable relative to the spring cover and the spring core between a locked position in which the relative rotation of the spring core and spring cover is prevented, and a released position in which the spring core is rotatable with respect to the spring cover, the locking means being retained in the spring cassette when in the released position.

The invention also provides a method of fabricating a pre-stressed seat belt retractor spring cassette comprising the steps of:

forming a spring core and pin;

driving the pin into the spring core;

assembling the spring core together with a spring cover and a spring;

stressing the spring; and driving the pin so that an end of it engages with an aperture in the spring cover, thereby locking the spring cover and spring core and preventing the spring from becoming unstressed.

The invention therefore facilitates the manufacture of a pre-stressed seat belt retractor spring cassette to simplify the manufacture of seat belt retractors and enables the spring core and thus the reel of a belt retractor to rotate once assembled.

BRIEF DESCRIPTION OF THE SEVERAL VIEWS OF THE DRAWINGS

A specific embodiment of the invention will now be described by way of example only with reference to the accompanying drawings in which:

FIGS. 4(a) to 4(d) show stages in the manufacture of a seat belt retractor; and

FIG. 5 illustrates, in section, a central portion of a further embodiment of the spring cassette according to the invention.

DETAILED DESCRIPTION OF THE INVENTION

Figure 1:
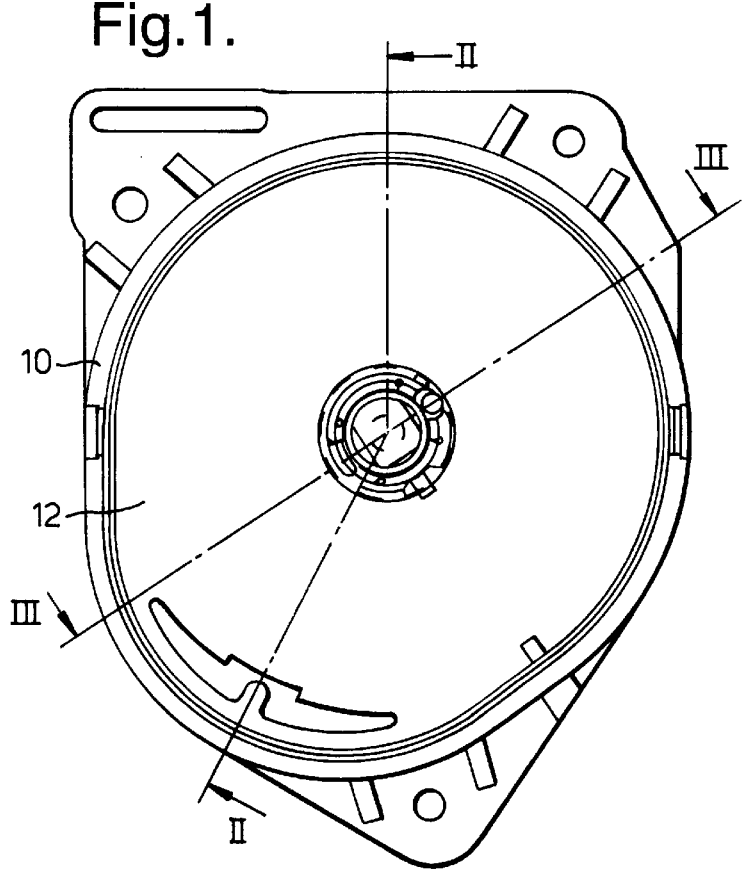
FIG. 1 shows in elevation a completed spring cassette according to the invention.
Figure 2:
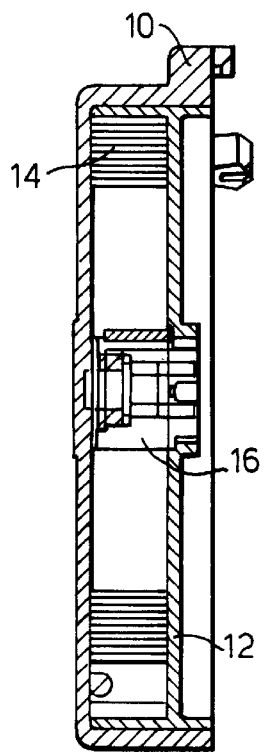
FIG. 2 shows a section of the spring cassette of FIG. 1 along the cranked line II—II.
Figure 3:
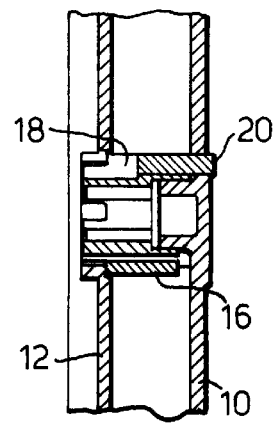
FIG. 3 shows the central portion of the spring cassette of FIG. 1 in section along the line III—III.

Referring to FIGS. 1, 2, and 3 the spring cassette has a spring cover 10 and a spring plate 12 for retaining a spring 14 which in this case is a torsion spring. A spring core 16 is rotatably mounted on the spring cover 10. One end of the spring 14 is fixed to the spring cover, and the other end of the spring 14 is fixed to the spring core 16. When the spring core 16 is rotated in one direction with respect to the spring cover 10, the spring becomes more tightly wound and there is an internal stress in the spring which tends to unwind it and creates a torque between the spring core and the spring cover.

The spring core 16 is provided with a hole 18, substantially parallel to its rotational axis and a pin 20 which fits tightly into this hole. The hole 18 need not fully surround the pin 20, and may for example be open along one side, provided that the hole 18 retains the pin 20 laterally to its axis whilst allowing the pin 20 to slide axially when driven. Two different positions of the pin 20 with respect to the hole 18 are shown in FIGS. 4(a) and 4(b), the pin 20 can be driven between these two positions. When the pin 20 is retained within the spring core 16, as shown in FIG. 4(b), the spring core 16 is rotated until a prescribed torque is exerted by the spring 14. The pin 20 is then driven so that one end of it projects beyond the edge of the spring core 16 and locates in an aperture 22 provided in the spring cover 10, as shown in FIG. 4(c), which then prevents the spring core 16 rotating relative to the spring cover 10 against the torque exerted by the spring 14.

The resulting pre-stressed spring cassette can then be conveniently assembled with a retractor belt reel with no danger of the spring unwinding. Once assembled the pin 20 is pushed back into the spring core 16 where it is securely retained, as shown in FIG. 4(d), and the spring core 16 can then rotate with respect to the spring cover 10 and the usual action of the seat belt retractor can occur.

The spring core 16 and pin 20 may be conveniently manufactured by molding them as a single piece as shown in FIG. 4(a). With this piece still in the mold, the mold core for forming the hole 18 is removed and the pin 20 is driven into the hole 18; in the process of drawing the pin 20, the web of material joining the spring core 16 and the pin 20 is severed. The spring core 16 with pre-driven pin 20, illustrated in FIG. 4(*b*) can then be ejected from the mold and is ready for assembling with the other components of the spring cassette.

It is of course understood that more than one aperture 22 may be provided in the spring cover, as shown in FIG. 5, so that the spring core can be locked in different angular positions. Indeed more than one pin may also be provided, the pin or each pin may be slidably retained in a part of the mechanism other than the spring core, for example, in the spring cover.

I claim:

1. A seat belt retractor spring cassette comprising:

a spring cover;

a spring core rotatably mounted to the spring cover;

a spring engaging said spring core and said spring cover, such that at times when said spring core and said spring cover have been rotated about an axis relative to one another in a first rotational sense to a spring stressed position, said spring is stressed to provide a torque urging the spring core to rotate about said axis with respect to the spring cover in an opposite rotational sense; and a lock slidable relative to the spring cover and the spring core between a locked position in which said lock engages both said spring core and said spring cover preventing the relative rotation of the spring core and spring cover away from said spring stressed position, and a released position in which said lock disengages from said spring cover and in which position the spring core is rotatable with respect to the spring cover;

said lock being retained within the spring core and axially inward of the spring cover in the released position and said lock being located wholly at a position radially spaced from said axis of rotation of said spring core.

2. The spring cassette as claimed in claim 1, wherein said lock comprises a pin.

3. The spring cassette as claimed in claim 2, further comprising:

a hole in said spring core retaining said pin in said released position whereby said spring core is rotatable relative to the spring cover; and at least one aperture in said spring cover and alignable with said hole;

wherein said pin comprises an end engaging said at least one aperture and another end engaging said hole when in said locked position thereby preventing relative rotation of said spring core and spring cover.

4. The spring cassette as claimed in claim 3, wherein said spring cover comprises a plurality of apertures for receiving said end of said pin.

5. A seat belt retractor comprising:

a frame;

a belt reel rotatably mounted with respect to said frame for winding a seat belt there-around;

a spring cover attached to said frame;

a spring core rotatably mounted with respect to the spring cover and connected to said belt reel;

a spring engaging said spring core and said spring cover, such that at times when said spring core and said spring cover have been rotated about an axis relative to one another in a first rotational sense to a spring stressed position, said spring is stressed to provide a torque urging the spring core to rotate about said axis with respect to the spring cover in the opposite rotational sense; and a lock slidable relative to the spring cover and the spring core between a locked position in which said lock engages both said spring core and said spring cover preventing the relative rotation of the spring core and spring cover away from said spring stressed position, and a released position in which said lock disengages from said spring cover and in which position the spring core is rotatable with respect to the spring cover;

said lock being retained within the spring core and axially inward of the spring cover in the released position and said lock being located wholly at a position radially spaced from said axis of rotation of said spring core.

6. The spring cassette as claimed in claim 5, wherein said lock comprises a pin.

7. The spring cassette as claimed in claim 6, further comprising:

a hole in said spring core retaining said pin in said released position whereby said spring core is rotatable relative to the spring cover; and at least one aperture in said spring cover and alignable with said hole;

wherein said pin comprises an end engaging said at least one aperture and another end engaging said hole when in said locked position thereby preventing relative rotation of said spring core and spring cover.

8. The spring cassette as claimed in claim 7, wherein said spring cover comprises a plurality of apertures for receiving said end of said pin.

* * * * *